(12) United States Patent
Otsuka et al.

(10) Patent No.: US 11,868,036 B2
(45) Date of Patent: Jan. 9, 2024

(54) TRANSMISSIVE SCREEN AND VIDEO IMAGE DISPLAY DEVICE

(71) Applicant: NITTO DENKO CORPORATION, Ibaraki (JP)

(72) Inventors: Masanori Otsuka, Ibaraki (JP); Hiroyuki Takemoto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/599,496

(22) PCT Filed: Mar. 27, 2020

(86) PCT No.: PCT/JP2020/014161
§ 371 (c)(1),
(2) Date: Sep. 28, 2021

(87) PCT Pub. No.: WO2020/196865
PCT Pub. Date: Oct. 1, 2020

(65) Prior Publication Data
US 2022/0146922 A1 May 12, 2022

(30) Foreign Application Priority Data
Mar. 28, 2019 (JP) .................. 2019-063947

(51) Int. Cl.
*G03B 21/60* (2014.01)
*G02F 1/137* (2006.01)
(Continued)

(52) U.S. Cl.
CPC .......... *G03B 21/60* (2013.01); *G02F 1/13439* (2013.01); *G02F 1/13471* (2013.01);
(Continued)

(58) Field of Classification Search
CPC ............. G02F 1/13756; G02F 1/13439; G02F 1/134309; G03B 21/60
See application file for complete search history.

(56) References Cited

U.S. PATENT DOCUMENTS

2005/0239526 A1* 10/2005 Takeda ................ G07F 17/3209
463/16
2006/0279839 A1 12/2006 May et al.
(Continued)

FOREIGN PATENT DOCUMENTS

JP          4-355719 A      12/1992
JP          6-301005 A      10/1994
(Continued)

OTHER PUBLICATIONS

International Search Report issued for corresponding International Patent Application No. PCT/JP2020/014161 dated Jun. 16, 2020, along with an English translation.
(Continued)

*Primary Examiner* — Lucy P Chien
(74) *Attorney, Agent, or Firm* — Hauptman Ham, LLP (57) ABSTRACT

The present invention provides a transmissive screen including a light control layer, the screen being reduced in reflection scattering toward an image source, and an image display apparatus using the transmissive screen.

6 Claims, 4 Drawing Sheets

(51) Int. Cl.
  *G02F 1/1343* (2006.01)
  *G02F 1/1347* (2006.01)
  *G02F 1/1335* (2006.01)
(52) U.S. Cl.
  CPC .... *G02F 1/13756* (2021.01); *G02F 1/134309* (2013.01); *G02F 1/133502* (2013.01); *G02F 2203/01* (2013.01)

(56) References Cited

U.S. PATENT DOCUMENTS

| | | | |
|---|---|---|---|
| 2008/0225187 A1* | 9/2008 | Yamanaka | H04N 9/3167 349/181 |
| 2016/0091637 A1* | 3/2016 | Yasushita | C09D 163/00 349/96 |
| 2017/0248824 A1 | 8/2017 | Kobayashi | |

FOREIGN PATENT DOCUMENTS

| | | |
|---|---|---|
| JP | 2003-255410 A | 9/2003 |
| JP | 2012-220540 A | 11/2012 |
| JP | 2015-40994 A | 3/2015 |
| JP | 2015-226296 A | 12/2015 |
| JP | 2017-156740 A | 9/2017 |
| JP | 2017-223950 A | 12/2017 |

OTHER PUBLICATIONS

Written Opinion issued for corresponding International Patent Application No. PCT/JP2020/014161 dated Jun. 16, 2020.

* cited by examiner

TRANSMISSIVE SCREEN AND VIDEO IMAGE DISPLAY DEVICE

CROSS REFERENCE TO RELATED APPLICATION

This application is a National Stage of International Application No. PCT/JP2020/014161, filed on Mar. 27, 2020, which designates the United States and was published in Japan, and which is based upon and claims priority to Japanese Patent Application No. 2019-063947 filed on Mar. 28, 2019 in the Japan Patent Office. All of the aforementioned applications are hereby incorporated by reference in their entireties.

TECHNICAL FIELD

The present invention relates to a transmissive screen and an image display apparatus using the transmissive screen.

BACKGROUND ART

There has heretofore been known a technology including displaying an image, which has been projected from an image source, such as a projector, onto one surface of a screen, on the other surface thereof.

As one example of the technology, in Patent Literature 1, there is a disclosure of a transmissive screen capable of displaying an image projected from its back surface on its front surface while maintaining a high transmitting property through use of a liquid crystal element that can adopt any one of a light transmitting state (transparent state), a light scattering state, and a state intermediate therebetween by controlling its transmittance. When such transmissive screen is used in, for example, a store window of a store, the projection of an image from the inside of the store window can allow an observer present outside the store window to view the image and to simultaneously observe an entity displayed in the store window.

As another example of the technology, in Patent Literature 2, there is a disclosure of an image display apparatus in which a transmissive screen, which can switch a light transmitting state and a light scattering state, and both the surfaces of which can each display an image projected onto its back surface, is used, and both the surfaces of the transmissive screen can be used as display surfaces by controlling the image projected onto one surface of the transmissive screen, the image projected onto the other surface thereof, and the light scattering state of the transmissive screen so that the images and the state may be in synchronization with each other.

CITATION LIST

Patent Literature

[PTL 1] JP 2012-220540 A
[PTL 2] JP 2015-226296 A

SUMMARY OF INVENTION

Technical Problem

Light that has entered such transmissive screen as described in each of Patent Literature 1 and Patent Literature 2 mainly undergoes front scattering, but some of the light undergoes back reflection scattering. Accordingly, in the image display apparatus of Patent Literature 1, when the screen of the apparatus is viewed from a side opposite to its display surface (image source side), an inverted image of an image displayed on the display surface is viewed, which is not preferred in the case when an image of which reversal is not desired, such as character information, is displayed. In addition, in the image display apparatus of Patent Literature 2, the image to be originally displayed on each display surface is overlapped with the inverted image of the image to be displayed on the other surface like noise, and hence a display effect (e.g., an advertising effect) is reduced.

The present invention has been made to solve the above-mentioned problems, and an object of the present invention is to provide a transmissive screen including a light control layer, the screen being reduced in reflection scattering toward an image source, and an image display apparatus using the transmissive screen.

Solution to Problem

The inventors of the present invention have made an investigation with a view to solving the problems, and as a result, have found that when all of the following three conditions are simultaneously satisfied in a transmissive screen including a pair of base materials with transparent electrode layers and a light control layer sandwiched between the pair of base materials with transparent electrode layers, reflection scattering toward an image source can be significantly suppressed, and hence the level at which no inverted image is viewed can be achieved: (i) a liquid crystal compound having a birefringence of from 0.05 to 0.15 is selected as a liquid crystal compound to be incorporated into the light control layer; (ii) a refractive index adjusting layer is arranged at least between the transparent electrode layer and the transparent base material on a display surface side; and (iii) an antireflection layer is arranged at least on the viewer side of the transparent base material on the display surface side.

According to one embodiment of the present invention, there is provided a transmissive screen, including in this order: a first transparent base material; a first transparent electrode layer; a light control layer containing a liquid crystal compound, and capable of switching a light transmitting state and a light scattering state in accordance with a voltage to be applied thereto; a second transparent electrode layer; and a second transparent base material, the transmissive screen being configured to display, on a surface on a second transparent base material side, an image projected onto a surface on a first transparent base material side. In the transmissive screen, the light control layer contains a liquid crystal compound having a birefringence of from 0.05 to 0.15, the second transparent base material and the second transparent electrode layer have arranged therebetween a refractive index adjusting layer, and a side opposite to a side of the second transparent base material having arranged thereon the second transparent electrode layer has arranged thereon an antireflection layer.

In one embodiment, the first transparent base material and the first transparent electrode layer have arranged therebetween a refractive index adjusting layer.

In one embodiment, a side opposite to a side of the first transparent base material having arranged thereon the first transparent electrode layer has arranged thereon an antireflection layer.

In one embodiment, the first transparent base material and the first transparent electrode layer have arranged therebetween a refractive index adjusting layer, a side opposite to a side of the first transparent base material having arranged thereon the first transparent electrode layer has arranged thereon an antireflection layer, and the transmissive screen is configured to display, on the surface on the second transparent base material side, the image projected onto the surface on the first transparent base material side, and to display, on the surface on the first transparent base material side, an image projected onto the surface on the second transparent base material side.

According to another embodiment of the present invention, there is provided an image display apparatus, including: the above-mentioned transmissive screen; and an image source configured to project an image onto one surface of the transmissive screen.

In one embodiment, the image display apparatus further includes an image source configured to project an image onto another surface of the transmissive screen.

Advantageous Effects of Invention

According to the present invention, the transmissive screen including the light control layer, the screen being reduced in reflection scattering toward the image source, and the image display apparatus using the transmissive screen are provided.

DESCRIPTION OF EMBODIMENTS

Preferred embodiments of the present invention are described below, but the present invention is not limited to these embodiments. Herein, a first transparent base material and a second transparent base material may be collectively referred to as "transparent base materials," and a first transparent electrode layer and a second transparent electrode layer may be collectively referred to as "transparent electrode layers." In addition, laminates sandwiching a light control layer, the laminates each including the transparent base material and the transparent electrode layer, may each be referred to as "transparent conductive film."

A. Transmissive Screen

A-1. Overall Configuration of Transmissive Screen

Figure 1:
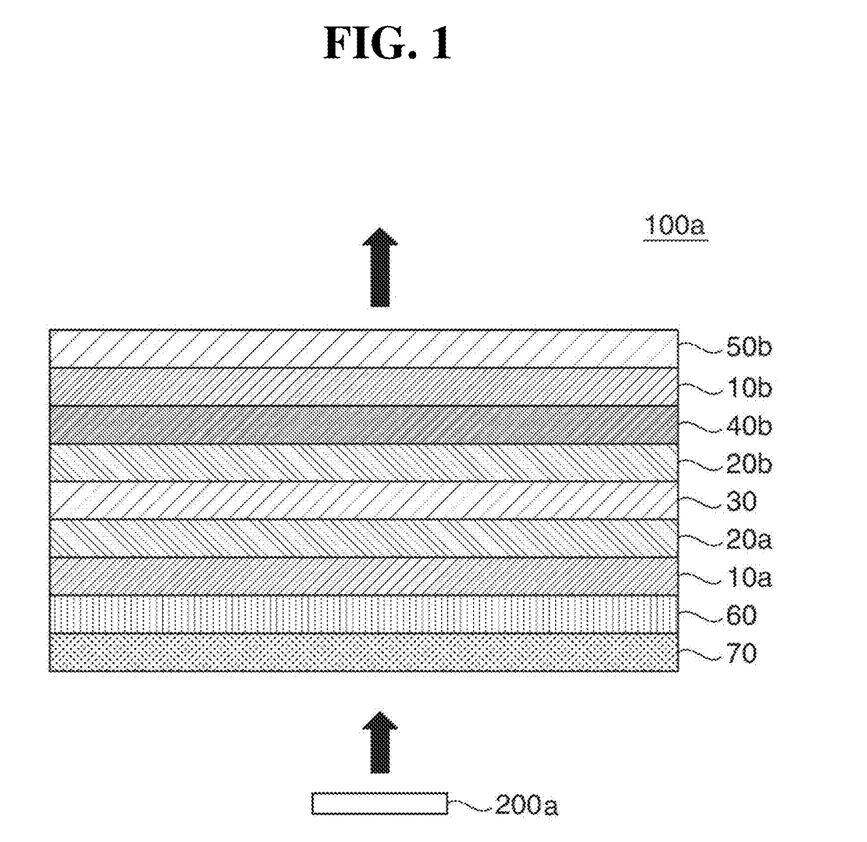
FIG. 1 is a schematic sectional view of a transmissive screen in one embodiment of the present invention.

FIG. 1 is a schematic sectional view of a transmissive screen in one embodiment of the present invention. A transmissive screen 100a includes a first transparent base material 10a, a first transparent electrode layer 20a, a light control layer 30, a second transparent electrode layer 20b, and a second transparent base material 10b in the stated order. A refractive index adjusting layer 40b is arranged between the second transparent base material 10b and the second transparent electrode layer 20b, and an antireflection layer 50b is arranged on a side opposite to the side of the second transparent base material 10b having arranged thereon the second transparent electrode layer 20b. The transmissive screen 100a further includes a transparent plate 70 on a side opposite to the side of the first transparent base material 10a having arranged thereon the first transparent electrode layer 20a via an adhesion layer 60.

Figure 2:
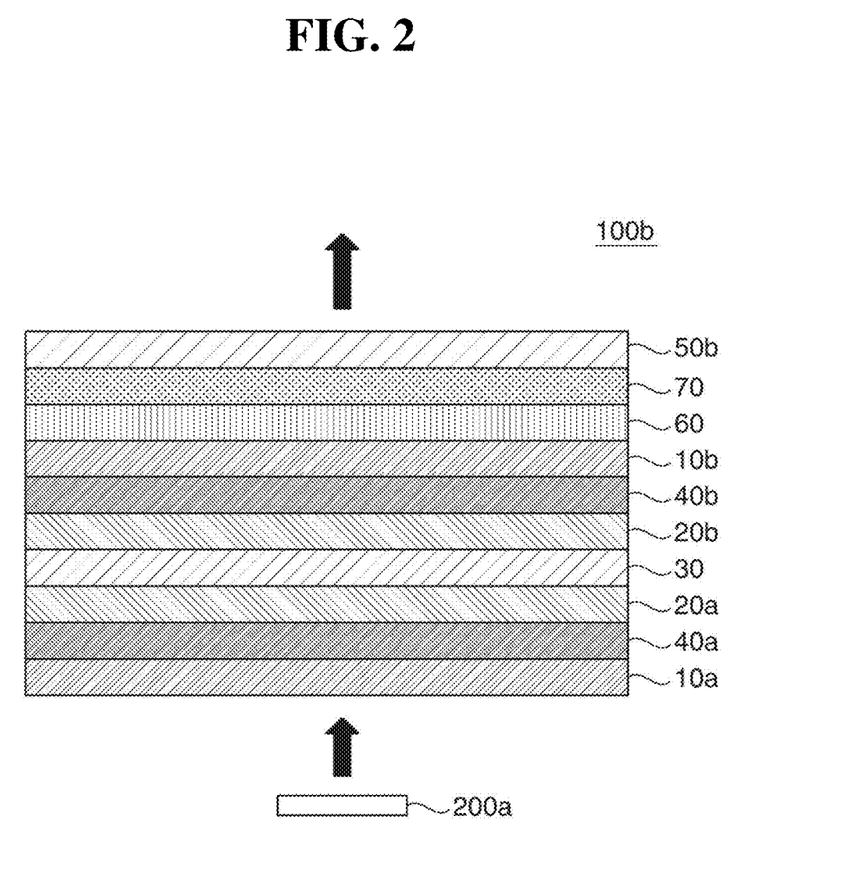
FIG. 2 is a schematic sectional view of a transmissive screen in another embodiment of the present invention.

FIG. 2 is a schematic sectional view of a transmissive screen in another embodiment of the present invention. A transmissive screen 100b includes the first transparent base material 10a, the first transparent electrode layer 20a, the light control layer 30, the second transparent electrode layer 20b, and the second transparent base material 10b in the stated order. A refractive index adjusting layer 40a and the refractive index adjusting layer 40b are arranged between the first transparent base material 10a and the first transparent electrode layer 20a, and between the second transparent base material 10b and the second transparent electrode layer 20b, respectively, and the antireflection layer 50b is arranged on the side opposite to the side of the second transparent base material 10b having arranged thereon the second transparent electrode layer 20b. The transmissive screen 100b further includes the adhesion layer 60 and the transparent plate 70 between the second transparent base material 10b and the antireflection layer 50b in the stated order from the second transparent base material 10b.

Figure 3:
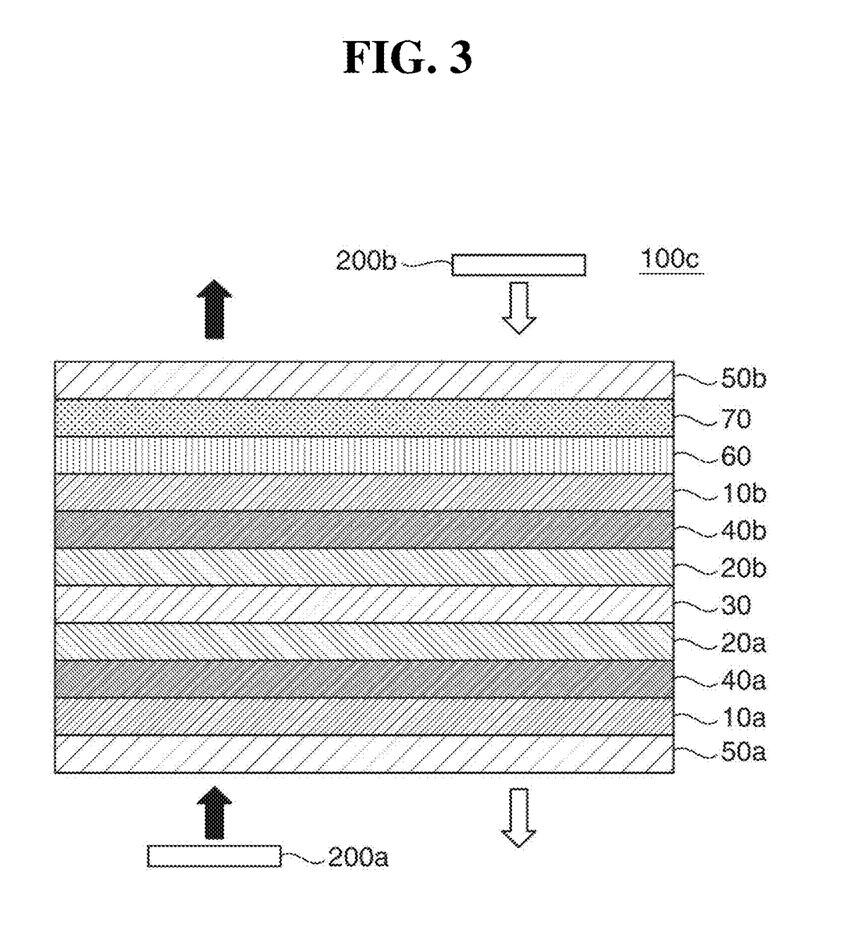
FIG. 3 is a schematic sectional view of a transmissive screen in still another embodiment of the present invention.

FIG. 3 is a schematic sectional view of a transmissive screen in still another embodiment of the present invention. A transmissive screen 100c includes the first transparent base material 10a, the first transparent electrode layer 20a, the light control layer 30, the second transparent electrode layer 20b, and the second transparent base material 10b in the stated order. The refractive index adjusting layers 40a and 40b are arranged between the first transparent base material 10a and the first transparent electrode layer 20a, and between the second transparent base material 10b and the second transparent electrode layer 20b, respectively. An antireflection layer 50a is arranged on the side opposite to the side of the first transparent base material 10a having arranged thereon the first transparent electrode layer 20a, and the antireflection layer 50b is arranged on the side opposite to the side of the second transparent base material 10b having arranged thereon the second transparent electrode layer 20b. The transmissive screen 100c further includes the adhesion layer 60 and the transparent plate 70 between the second transparent base material 10b and the antireflection layer 50b in the stated order from the second transparent base material 10b.

The transmissive screens 100a and 100b can each display, on a surface on the second transparent base material 10b side, an image projected from an image source 200a onto a surface on the first transparent base material 10a side. Meanwhile, the transmissive screen 100c can display, on the surface on the second transparent base material 10b side, the image projected from the image source 200a onto the surface on the first transparent base material 10a side, and can display, on the surface on the first transparent base material 10a side, an image projected from an image source 200b onto the surface on the second transparent base material 10b side.

In each of the illustrated examples, the transmissive screen includes the transparent plate laminated via any appropriate adhesion layer (adhesive layer or pressure-sensitive adhesive layer), but the transparent plate and the adhesion layer may be omitted in accordance with purposes. In addition, an alignment film (not shown) may be arranged on the surface of any one of the transparent electrode layers facing the light control layer in accordance with, for example, the driving mode of the light control layer.

The thickness of the transmissive screen is, for example, from 100 μm to 5,000 μm, preferably from 150 μm to 3,000 μm.

The haze of the transmissive screen is, for example, 10% or less, preferably 5% or less when the light control layer is in a light transmitting state. In addition, the haze is, for example, 50% or more, preferably 90% or more when the light control layer is in a light scattering state.

A-2. First Transparent Base Material

Any appropriate material may be used as a material for forming the first transparent base material. Specifically, for example, a polymer base material, such as a film or plastic base material, is preferably used. This is because the base material is excellent in smoothness and wettability to a composition for forming a transparent electrode layer, and its productivity can be significantly improved by continuous production with a roll.

The material for forming the first transparent base material is typically a polymer film containing a thermoplastic resin as a main component. Examples of the thermoplastic resin include: a polyester-based resin; a cycloolefin-based resin, such as polynorbornene; an acrylic resin; a polycarbonate resin; and a cellulose-based resin. Of those, a polyester-based resin, a cycloolefin-based resin, or an acrylic resin is preferred. Those resins are each excellent in, for example, transparency, mechanical strength, thermal stability, and water barrier property. Those thermoplastic resins may be used alone or in combination thereof. In addition, an optical film to be used in a polarizing plate, for example, a low-retardation base material, a high-retardation base material, a retardation plate, an absorptive polarizing film, or a polarization selective reflection film may also be used as the first transparent base material.

The thickness of the first transparent base material is preferably 200 μm or less, more preferably from 3 μm to 100 μm, still more preferably from 5 μm to 50 μm. When the thickness of the first transparent base material is set to 200 μm or less, the function of the light control layer can be sufficiently exhibited.

The total light transmittance of the first transparent base material is preferably 30% or more, more preferably 60% or more, still more preferably 80% or more.

A-3. First Transparent Electrode Layer

The first transparent electrode layer may be formed of, for example, a metal oxide, such as indium tin oxide (ITO), zinc oxide (ZnO), or tin oxide ($SnO_2$). A transparent electrode layer containing ITO is preferably formed. The transparent electrode layer containing ITO is excellent in transparency. The first transparent electrode layer may be patterned into a desired shape in accordance with purposes.

The light transmittance of the first transparent electrode layer is preferably 85% or more, more preferably 87% or more, still more preferably 90% or more. In the present invention, when the transparent electrode layer having a light transmittance within such ranges is used, the transmissive screen has a high light transmittance under a light transmitting state. Although the light transmittance is preferably as high as possible, its upper limit is, for example, 99%.

The first transparent electrode layer preferably contains crystal grains. The incorporation of the crystal grains can improve the light transmittance of the layer. Although a method of forming the crystal grains is not limited, the crystal grains may be suitably formed by, for example, heating the layer under air. The area occupancy of the crystal grains in the transparent electrode layer is, for example, 30% or more, preferably 50% or more, more preferably 80% or more. The upper limit of the area occupancy is, for example, 100%. When the area occupancy of the crystal grains falls within the ranges, the light transmittance can be improved.

The area occupancy of the crystal grains can be calculated from an area ratio between a crystal grain region and a non-crystalline region obtained by the observation of the surface of the transparent electrode layer with a transmission electron microscope (TEM).

The surface roughness Ra of the first transparent electrode layer is, for example, 0.1 nm or more. When the surface roughness Ra of the first transparent electrode layer is less than 0.1 nm, its adhesiveness with the first transparent base material may deteriorate. The upper limit of the surface roughness Ra of the first transparent electrode layer is preferably less than 1.2 nm, more preferably 1.0 nm or less, still more preferably less than 1.0 nm, particularly preferably 0.8 nm or less. When the surface roughness Ra of the first transparent electrode layer is excessively large, it may be difficult to suitably form the crystal grains. The surface roughness Ra as used herein means an arithmetic average roughness Ra measured with an atomic force microscope (AFM).

The thickness of the first transparent electrode layer is, for example, 10 nm or more, preferably 15 nm or more. When the thickness of the transparent electrode layer is less than 10 nm, the area occupancy of the crystal grains may reduce. The upper limit of the thickness of the first transparent electrode layer is, for example, 50 nm or less, preferably 35 nm or less, more preferably less than 30 nm, still more preferably 27 nm or less. When the thickness of the transparent electrode layer is more than 50 nm, its transmittance may deteriorate, and the surface roughness of the transparent electrode layer may become larger.

A-4. Light Control Layer

As described above, the light control layer contains a liquid crystal compound. The light control layer containing a liquid crystal compound is typically formed by dispersing a liquid crystal compound in a polymer matrix. In the light control layer, a light transmitting state and a light scattering state can be switched by changing the degree of alignment of the liquid crystal compound based on the presence or absence of the application of a voltage. In the transmissive screen of the present invention, an image projected toward one surface of the light control layer in the light scattering state is displayed on the other surface thereof.

In one embodiment, the light control layer is in the light transmitting state at the time of application of a voltage, and the light control layer is in the light scattering state at the time of application of no voltage (normal mode). In this embodiment, the liquid crystal compound is not aligned at the time of application of no voltage, resulting in the light scattering state. When a voltage is applied, the liquid crystal compound is aligned, and the refractive index of the liquid crystal compound and the refractive index of the polymer matrix match with each other, resulting in the light transmitting state.

In another embodiment, the light control layer is in the light scattering state at the time of application of a voltage, and the light control layer is in the light transmitting state at the time of application of no voltage (reverse mode). In this embodiment, with an alignment film arranged on a surface of the transparent electrode layer, the liquid crystal compound is aligned at the time of application of no voltage, resulting in the light transmitting state. When a voltage is applied, the alignment of the liquid crystal compound is disturbed, resulting in the light scattering state.

Examples of the light control layer as described above include a light control layer containing a polymer-dispersed liquid crystal and a light control layer containing a polymer-network liquid crystal. The polymer-dispersed liquid crystal has a structure in which a liquid crystal compound in the form of droplets is dispersed in a polymer matrix. The polymer-network liquid crystal has a structure in which a liquid crystal compound is dispersed in a polymer network. The liquid crystal has a continuous phase in the polymer network.

In the case of the polymer-dispersed liquid crystal, the average particle diameter of the droplets of the liquid crystal compound may be, for example, from 4 μm to 9 μm in terms of volume average. In the case of the polymer-network liquid crystal, the average diameter of liquid crystal domains formed by the polymer network may be, for example, from 4 μm to 9 μm. When any such diameter is excessively small, a problem in that a sufficient scattering property as a screen is not obtained may occur. Meanwhile, when any such diameter is excessively large, for example, the following problem may occur: a sufficient scattering property as a screen is not obtained; or back reflection scattering becomes larger.

Any appropriate liquid crystal compound is used as the liquid crystal compound as long as the compound has a birefringence $\Delta n(=n_e-n_o$ where "$n_e$" represents the refractive index of a liquid crystal compound molecule in its major axis direction, and "$n_o$" represents the refractive index of the liquid crystal compound molecule in its minor axis direction) of from 0.05 to 0.15 at a wavelength of 589 nm, and is a non-polymeric type. When the birefringence of the liquid crystal compound is less than 0.05, a problem in that a sufficient scattering property as a screen is not obtained may occur. In addition, when the birefringence of the liquid crystal compound is more than 0.15, for example, the following problem may occur: a sufficient scattering property as a screen is not obtained; or back reflection scattering becomes larger. The birefringence $\Delta n$ of the liquid crystal compound is preferably from 0.05 to 0.12.

The liquid crystal compound may have positive dielectric anisotropy or negative dielectric anisotropy. Examples of the liquid crystal compound may include nematic, smectic, and cholesteric liquid crystal compounds. A nematic liquid crystal compound is preferably used because excellent transparency can be achieved under the light transmitting state. Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, a cholesterol-based compound, and a fluorine-based compound. Those liquid crystal compounds may be used alone or in combination thereof.

The content of the liquid crystal compound in the light control layer is, for example, 40 wt % or more, preferably from 50 wt % to 99 wt %, more preferably from 50 wt % to 80 wt %.

A resin for forming the polymer matrix may be appropriately selected depending on, for example, the light transmittance and the refractive index of the liquid crystal compound. The resin may be an optically isotropic resin or may be an optically anisotropic resin. In one embodiment, the resin is an active energy ray-curable resin. For example, a liquid crystal polymer obtained by curing a polymerizable liquid crystal compound, a (meth)acrylic resin, a silicone-based resin, an epoxy-based resin, a fluorine-based resin, a polyester-based resin, and a polyimide resin may be preferably used.

The content of the polymer matrix in the light control layer is preferably from 1 wt % to 60 wt %, more preferably from 20 wt % to 50 wt %. When the content of the polymer matrix is less than 1 wt %, a problem of, for example, impairment of mechanical strength of the light control layer may occur. Meanwhile, when the content of the polymer matrix is more than 60 wt %, a problem of, for example, an increase in driving voltage or a reduction in light control function may occur.

The thickness of the light control layer is, for example, from 5 μm to 100 μm, preferably from 10 μm to 80 μm, more preferably from 15 μm to 50 μm.

The light control layer may be produced by any appropriate method. Specific examples thereof include production methods of an emulsion system and a polymerization-induced phase separation system.

The light control layer production method of the emulsion system includes, for example, applying an emulsion application liquid containing the resin for forming the polymer matrix and the liquid crystal compound to the transparent electrode layer surface of a first transparent conductive film to form an applied layer, and drying the applied layer to cause the resin for forming the polymer matrix to form the polymer matrix. The emulsion application liquid is preferably an emulsion containing the resin for forming the polymer matrix in its continuous phase and containing the liquid crystal compound in its dispersed phase, and may be, for example, an emulsion containing a mixed liquid of the resin for forming the polymer matrix and an application solvent (e.g., water, an aqueous organic solvent, or a mixed liquid thereof) in its continuous phase, and containing the liquid crystal compound in its dispersed phase. The application and drying of the emulsified application liquid may result in the formation of a light control layer having such a configuration that the droplets of the liquid crystal compound are dispersed in the polymer matrix. The transmissive screen is typically obtained by laminating a second transparent conductive film on the formed light control layer.

When the emulsion system is used, the emulsion application liquid may be prepared by: producing a liquid crystal-dispersed liquid containing liquid crystal capsules whose particle diameters and particle diameter distribution have been controlled to predetermined values in advance by a membrane emulsification method or the like; and mixing the liquid crystal-dispersed liquid and the resin for forming the polymer matrix. The membrane emulsification method enables suitable preparation of liquid crystal capsules having desired particle diameters and having a uniform particle size distribution.

The average particle diameter of the liquid crystal capsules is, for example, 4 μm or more, preferably 5 μm or more. In addition, the average particle diameter of the liquid crystal capsules is 9 μm or less, preferably 8 μm or less. When the average particle diameter of the liquid crystal capsules falls within the ranges, the average particle diameter of the droplets of the liquid crystal compound in the light control layer can be set within a desired range. The average particle diameter of the liquid crystal capsules is a volume-average particle diameter.

The particle diameter of the liquid crystal capsules in the emulsion application liquid preferably has a relatively narrow particle size distribution. When the uniformity of the particle diameters of the capsules is improved, the light control layer is free of droplets each having such a particle diameter that the wavelength dependence of its transmittance is large (e.g., a particle diameter of less than 4 μm or more than 9 μm), and hence the following effect can be obtained: light scattering having a constant transmittance for all visible light wavelengths can be achieved in the light control layer. The coefficient of variation (CV value) of the particle diameter of the liquid crystal capsules in the emulsion application liquid may be, for example, less than 0.40, and may be preferably 0.35 or less, more preferably 0.30 or less. In one embodiment, an emulsion application liquid substantially free of such liquid crystal capsules that the particle diameter is less than 4 µm or more than 9 µm (e.g., an emulsion application liquid in which the ratio of the volume of the liquid crystal capsules each having a particle diameter of less than 4 µm or more than 9 µm to the total volume of the liquid crystal capsules is 10% or less) may be used.

In the membrane emulsification method, a liquid crystal-dispersed liquid containing liquid crystal capsules each having a desired particle diameter may be obtained by passing a mixed liquid of the liquid crystal compound and a dispersion medium through a porous membrane having through-holes a plurality of times. The number of times that the mixed liquid is passed through the porous membrane may be set to, for example, 10 times or more. The hole diameter of each of the through-holes of the porous membrane is preferably from about substantially 1 times to about substantially 3 times as large as the diameter that the liquid crystal capsules are each desired to have. In addition, the flow rate of the dispersed liquid at the time of its passage through the porous membrane may be, for example, from 10 mL/min/cm$^2$ to 150 mL/min/cm$^2$, preferably from 30 mL/min/cm$^2$ to 90 mL/min/cm$^2$. In the light control layer formed by the drying of the emulsion application liquid, the particle diameter of each of the droplets of the liquid crystal compound may be larger or smaller than the particle diameter of each of the liquid crystal capsules in the application liquid by about fpm. For details about the membrane emulsification method, reference may be made to disclosures in, for example, JP 04-355719 A and JP 2015-40994 A (these disclosures are incorporated herein by reference).

The light control layer production method of the polymerization-induced phase separation system includes, for example, applying an application liquid containing a radiation-curable resin for forming the polymer matrix and the liquid crystal compound to the transparent electrode layer surface of the first transparent conductive film to form an applied layer, laminating the second transparent conductive film on the applied layer to form a laminate, and applying a radiation to the laminate to polymerize the resin for forming the polymer matrix, thereby causing a phase separation between the polymer matrix and the liquid crystal compound. The application liquid is preferably in a uniform phase state. Alternatively, the following may be performed: a space between the first transparent conductive film and the second transparent conductive film laminated via a spacer is filled with the application liquid, and then the phase separation is performed by the application of the radiation.

In the case where the polymerization-induced phase separation system is used, when the surfaces of the transparent electrode layers are subjected to surface treatment, a chemical influence of an interface of the transparent electrode layers on the polymerization-induced phase separation is prevented, and hence the particle diameters and/or particle size distribution of the droplets of the liquid crystal compound can be adjusted within a desired range. Examples of the surface treatment include: thin-film coating; resin coating with a silane coupling agent or the like; sputtering with silicon oxide, silicon nitride, titanium oxide, or the like; plasma treatment; UV ozone treatment; and corona treatment.

A-5. Second Transparent Base Material

The same description as that of the first transparent base material may be applied to the second transparent base material. The second transparent base material may have the same configuration as that of the first transparent base material, or may have a configuration different therefrom.

A-6. Second Transparent Electrode Layer

The same description as that of the first transparent electrode layer may be applied to the second transparent electrode layer. The second transparent electrode layer may have the same configuration as that of the first transparent electrode layer, or may have a configuration different therefrom.

A-7. Refractive Index Adjusting Layer

In the present invention, the refractive index adjusting layer is arranged at least between the transparent base material and the transparent electrode layer on a display surface side (viewer side). With such configuration, interface reflection between the transparent base material and the transparent electrode layer can be suppressed by an interference effect, and hence contribution to a reduction in reflection scattering toward a screen back surface can be achieved. The refractive index adjusting layer may be formed of one layer, or may be a laminate of two or more layers.

The refractive index of the refractive index adjusting layer is preferably from 1.3 to 1.8, more preferably from 1.35 to 1.7, still more preferably from 1.38 to 1.68. In the case of a single-layer refractive index adjusting layer, for example, when the transparent electrode layer is ITO, the refractive index is desirably rather low so that the refractive index of ITO can be optically alleviated, and hence the refractive index is preferably, for example, from 1.38 to 1.46. Thus, the interface reflection between the transparent base material and the transparent electrode layer can be suitably reduced.

The refractive index adjusting layer is formed of an inorganic material, an organic material, or a mixture of the inorganic material and the organic material. Examples of the material for forming the refractive index adjusting layer include inorganic materials, such as NaF, $Na_3AlF_6$, LiF, $MgF_2$, $CaF_2$, $SiO_2$, $LaF_3$, $CeF_3$, $Al_2O_3$, $TiO_2$, $Ta_2O_5$, $ZrO_2$, ZnO, ZnS, and $SiO_x$ ("x" represents 1.5 or more and less than 2), and organic materials, such as an acrylic resin, an epoxy resin, a urethane resin, a melamine resin, an alkyd resin, and a siloxane-based polymer. In particular, a thermosetting resin formed of a mixture of a melamine resin, an alkyd resin, and an organosilane condensate is preferably used as the organic material.

The refractive index adjusting layer may contain nanofine particles having an average particle diameter of from 1 nm to 100 nm. The incorporation of the nanofine particles into the refractive index adjusting layer can facilitate the adjustment of the refractive index of the refractive index adjusting layer itself.

The content of the nanofine particles in the refractive index adjusting layer is preferably from 0.1 wt % to 90 wt %. In addition, the content of the nanofine particles in the refractive index adjusting layer is more preferably from 10 wt % to 80 wt %, still more preferably from 20 wt % to 70 wt %.

As an inorganic oxide for forming the nanofine particles, there are given, for example, silicon oxide (silica), hollow nanosilica, titanium oxide, aluminum oxide, zinc oxide, tin oxide, zirconium oxide, and niobium oxide. Of those, silicon oxide (silica), titanium oxide, aluminum oxide, zinc oxide, tin oxide, zirconium oxide, and niobium oxide are preferred. Those inorganic oxides may be used alone or in combination thereof.

The thickness of the refractive index adjusting layer is preferably from 10 nm to 200 nm, more preferably from 20 nm to 150 nm, still more preferably from 30 nm to 130 nm. When the thickness of the refractive index adjusting layer is excessively small, a continuous coating film is hardly obtained. In addition, when the thickness of the refractive index adjusting layer is excessively large, there is a tendency that the transparency of the screen in a light transmitting state reduces, or a crack is liable to occur in the layer.

The refractive index adjusting layer may be formed by, for example, an application method, such as a wet method, a gravure coating method, or a bar coating method, a vacuum deposition method, a sputtering method, or an ion plating method through use of any one of the above-mentioned materials.

A-8. Antireflection Layer

In the present invention, the antireflection layer is arranged at least on the viewer side of the transparent base material on the display surface side (viewer side). The antireflection layer may be arranged so as to serve as the outermost surface layer of the transmissive screen. The antireflection layer may have, on its surface, an anticontamination layer containing a fluorine group-containing silane-based compound, a fluorine group-containing organic compound, or the like to the extent that its reflectance is not largely affected (consequently, the effects of the present invention are not impaired).

The reflectance of the antireflection layer for light having a wavelength of 589 nm is preferably from 0.1% to 1.5%, more preferably from 0.1% to 1.0%.

In the formation of the antireflection layer, in general, the optical thickness (product of the refractive index and thickness) of a thin film is adjusted so that the phase of the incident light and its reversed phase of the reflected light may cancel each other. The antireflection layer may be formed of one thin film, or may be a laminate of two or more thin films. When the antireflection layer is a laminate of two or more thin films having different refractive indices, its reflectance can be reduced in a wide wavelength range of visible light.

As a material for the thin film for forming the antireflection layer, there are given, for example, oxides, nitrides, and fluorides of metals. Examples thereof include low-refractive index materials each having a refractive index of from about 1.35 to about 1.55, such as silicon oxide and magnesium fluoride, and high-refractive index materials each having a refractive index of from about 1.80 to about 2.40, such as titanium oxide, niobium oxide, zirconium oxide, tin-doped indium oxide (ITO), and antimony-doped tin oxide (ATO). In addition, a thin film formed of, for example, titanium oxide or a mixture of the low-refractive index material and the high-refractive index material (e.g., a mixture of titanium oxide and silicon oxide) may be formed as a medium-refractive index layer having a refractive index of from about 1.50 to about 1.85 in addition to a low-refractive index layer and a high-refractive index layer.

Examples of the laminate configuration of the antireflection layer include: a two-layer configuration formed of a high-refractive index layer having an optical thickness of from about 240 nm to about 260 nm and a low-refractive index layer having an optical thickness of from about 120 nm to about 140 nm; a three-layer configuration formed of a medium-refractive index layer having an optical thickness of from about 170 nm to about 180 nm, a high-refractive index layer having an optical thickness of from about 60 nm to about 70 nm, and a low-refractive index layer having an optical thickness of from about 135 nm to about 145 nm; a four-layer configuration formed of a high-refractive index layer having an optical thickness of from about 25 nm to about 55 nm, a low-refractive index layer having an optical thickness of from about 35 nm to about 55 nm, a high-refractive index layer having an optical thickness of from about 80 nm to about 240 nm, and a low-refractive index layer having an optical thickness of from about 120 nm to about 150 nm; and a five-layer configuration formed of a low-refractive index layer having an optical thickness of from about 15 nm to about 30 nm, a high-refractive index layer having an optical thickness of from about 20 nm to about 40 nm, a low-refractive index layer having an optical thickness of from about 20 nm to about 40 nm, a high-refractive index layer having an optical thickness of from about 240 nm to about 290 nm, and a low-refractive index layer having an optical thickness of from about 100 nm to about 200 nm. The ranges of the refractive indices of the thin films for forming the antireflection layer and the thicknesses thereof are not limited to the examples. In addition, the antireflection layer may be a laminate of six or more thin films.

A method of forming the antireflection layer is not particularly limited, and any one of a wet coating method and a dry coating method may be adopted. Of those, the dry coating method, such as vacuum deposition, CVD, sputtering, or electron beam evaporation, is preferred because a thin film having a uniform thickness can be formed and the thickness can be easily adjusted.

A-9. Transparent Plate

The transparent plate may be arranged as required for the purpose of, for example, preventing the deflection of the transmissive screen. A material for forming the transparent plate is, for example, glass, or a transparent plastic, such as a polycarbonate resin or an acrylic resin.

B. Image Display Apparatus

In one embodiment, an image display apparatus of the present invention includes the transmissive screen described in the section A and an image source configured to project an image onto one surface of the transmissive screen. In this embodiment, as illustrated in FIG. 1 or FIG. 2, the side on which the antireflection layer is formed and the refractive index adjusting layer is arranged between the transparent base material and the transparent electrode layer with respect to the light control layer can serve as a display surface side (viewer side), by projecting the image from the image source onto the back surface thereof.

In another embodiment, the image display apparatus of the present invention includes the transmissive screen described in the section A, an image source configured to project an image onto one surface of the transmissive screen, and an image source configured to project an image onto the other surface of the transmissive screen. In this embodiment, the following transmissive screen is used: the screen includes the antireflection layers on both of its surfaces; and the refractive index adjusting layers are arranged between the first transparent base material and the first transparent electrode layer, and between the second transparent base material and the second transparent electrode layer. Accordingly, both the surfaces can be used as display surfaces.

The image source is, for example, a projector. The projection system of the projector is not limited, and may be, for example, a LCD system, a DLP system, or a LCoS system. The focus type thereof is also not limited, and may be anyone of, for example, a short-focus type, a standard type, and a long-focus type. When images are projected onto both the surfaces of the screen with two projectors, the projectors may be different from each other as long as the projectors are not significantly different from each other in brightness.

The position at which the image source is arranged may be appropriately set in accordance with, for example, purposes and applications. The image source may be arranged in a front direction or an oblique direction with respect to the screen. For example, the image source may be suspended from a ceiling to project the image toward the screen arranged below. Alternatively, the image source may be arranged on a floor to project the image toward the screen arranged above.

EXAMPLES

The present invention is specifically described below byway of Examples, but the present invention is by no means limited to these Examples. In addition, in the following description, the expressions "part(s)" and "%" mean "part(s) by weight" and "wt %", respectively, unless otherwise specified.

Evaluation methods in Examples are as described below.
(1) Reflectance of Antireflection Layer A black acrylic plate (e.g., PARAGLAS BLACK (thickness: 1 mm) manufactured by Kuraray Co., Ltd.) was bonded to a base material surface of a base material with an antireflection layer via a pressure-sensitive adhesive layer. After that, the visibility reflectance of the antireflection layer at an angle of incidence of 5° was measured with a spectrophotometer (manufactured by Hitachi High-Tech Science Corporation, UH4150) and a reflection integrating sphere.
(2) Birefringence of Liquid Crystal Compound Lecithin was thinly applied onto the measuring plate of an Abbe refractometer (e.g., NAR-1T SOLID manufactured by Atago Co., Ltd. with an eyepiece with a polarizing plate). After that, a liquid crystal compound was dropped onto the applied layer, and vertically aligned on the measuring plate. Under the state, both of the "$n_o$" and "$n_e$" of the compound were measured by changing the polarization direction of the eyepiece.

Example 1

(First Transparent Conductive Film)

Five layers, that is, a $SiO_2$ layer, a $TiO_2$ layer, a $SiO_2$ layer, a $TiO_2$ layer, and a $SiO_2$ layer were sequentially formed on one surface of a transparent base material (PET base material, thickness: 50 μm) by a vapor deposition method so that the optical thicknesses of the respective layers became 30 nm, 35 nm, 35 nm, 270 nm, and 115 nm, respectively. Thus, an antireflection layer was arranged. The reflectance of the antireflection layer was 0.2%. Next, a $SiO_x$ (x=1.5) layer having a thickness of 3 nm and a $SiO_2$ layer having a thickness of 17 nm formed on the $SiO_2$ layer were formed in the stated order on the other surface of the transparent base material by a sputtering method. Thus, a refractive index adjusting layer was arranged. Next, a transparent electrode layer (ITO layer) was formed on the refractive index adjusting layer by the sputtering method. Thus, a transparent conductive film A having the configuration [antireflection layer/transparent base material/refractive index adjusting layer/transparent electrode layer] was obtained.

(Second Transparent Conductive Film)

The transparent conductive film A was used as a second transparent conductive film.

(Production of Liquid Crystal Compound)

Compounds having the following composition were mixed at 150° C. for 20 minutes, and were then slowly cooled to room temperature. Thus, a liquid crystal compound (1) having a Δn of 0.097, a Δε of 6.5, and a liquid crystal temperature of from −40° C. to 90° C. was obtained.

1.8%

8.1%

1.8%

8.1%

10.0%

(Liquid Crystal Emulsification)

60 Parts of the liquid crystal compound (1), 40 parts of pure water, and 0.5 part of a dispersant (manufactured by DKS Co., Ltd., "NOIGEN ET159") were mixed, and were stirred with a homogenizer at 8,000 rpm for 10 minutes to provide a liquid crystal emulsion.

(Production of Application Liquid)

50 Parts of the liquid crystal-dispersed liquid obtained by the emulsification was mixed with 50 parts of a urethane emulsion solution (manufactured by Kusumoto Chemicals, Ltd., product name: "NeoRez R967," solvent=water, solid content concentration=40%). Thus, an application liquid was produced.

(Production of Light Control Layer)

The emulsion application liquid was applied to the transparent electrode layer-side surface of the first transparent conductive film, and was dried to form a light control layer containing the droplets of the liquid crystal compound having a volume-average particle diameter of 6 µm when viewed from the surface of the first transparent conductive film, and having a layer thickness of 20 µm. After that, the second transparent conductive film was laminated so that its transparent electrode layer-side surface faced the light control layer. Thus, a transmissive screen A was obtained.

(Image Display Apparatus)

Figure 4:
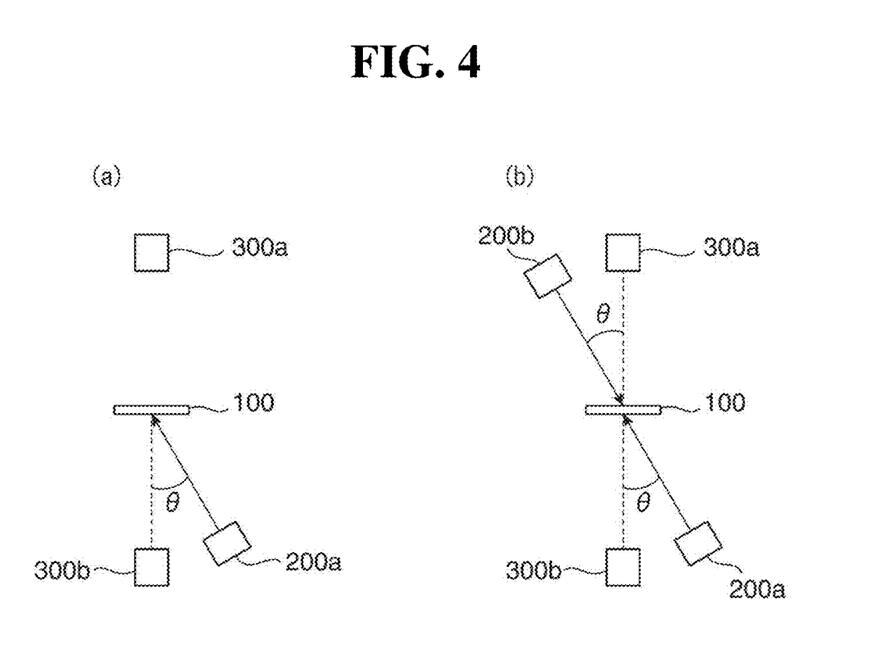
FIG. 4 are schematic views of image display apparatus produced in Examples and Comparative Examples when viewed from above.

As illustrated in FIG. 4(a), the transmissive screen A was arranged as a transmissive screen 100, and the projector 200a (manufactured by iCODIS, "G2 MINI PROJECTOR SMALL DLP" (150 ANSI lumens)) was arranged so that its projection angle θ with respect to one surface of the screen became 30° and its distance therefrom became 50 cm. Thus, an image display apparatus A was formed. Further, a spectroradiometer 300b (manufactured by Topcon Technohouse Corporation, "SR-UL2") was arranged in the front direction of the surface of the transmissive screen on the side having arranged thereon the projector at a distance of 50 cm, and a spectroradiometer 300a (manufactured by Topcon Technohouse Corporation, "SR-UL2") was arranged in the front direction of the other surface (display surface) side thereof at a distance of 50 cm. In the configuration, the brightnesses of the display surface and back surface (surface on the side having arranged thereon the projector) of the transmissive screen when a white display image was projected from the projector 200a were measured with the spectroradiometers. Next, the image of a shoe and a character was projected, and the back surface (surface on the side having arranged thereon the projector) was observed.

Example 2

(First Transparent Conductive Film)

A transparent conductive film B having the configuration [transparent base material/refractive index adjusting layer/transparent electrode layer] was obtained in the same manner as in the production of the transparent conductive film A except that no antireflection layer was formed.

(Second Transparent Conductive Film)

The transparent conductive film A was used as a second transparent conductive film.

(Light Control Layer)

A light control layer was formed in the same manner as in Example 1 to obtain a transmissive screen B.

(Image Display Apparatus)

An image display apparatus B was formed in the same manner as in Example 1 except that the transmissive screen B was arranged as the transmissive screen 100 so that the second transparent conductive film was on a display surface side. The brightnesses of the display surface and back surface (surface on the side having arranged thereon the projector) of the transmissive screen when a white display image was projected with the image display apparatus B were measured in the same manner as in Example 1. Next, the image of a shoe and a character was projected, and the back surface (surface on the side having arranged thereon the projector) was observed.

Example 3

(First Transparent Conductive Film)

A transparent conductive film C having the configuration [transparent base material/transparent electrode layer] was obtained in the same manner as in the production of the transparent conductive film A except that no antireflection layer and no refractive index adjusting layer were formed.

(Second Transparent Conductive Film)

The transparent conductive film A was used as a second transparent conductive film.

(Light Control Layer)

A light control layer was formed in the same manner as in Example 1 to obtain a transmissive screen C.

(Image Display Apparatus)

An image display apparatus C was formed in the same manner as in Example 1 except that the transmissive screen C was arranged as the transmissive screen 100 so that the second transparent conductive film was on a display surface side. The brightnesses of the display surface and back surface (surface on the side having arranged thereon the projector) of the transmissive screen when a white display image was projected with the image display apparatus C were measured in the same manner as in Example 1. Next, the image of a shoe and a character was projected, and the back surface (surface on the side having arranged thereon the projector) was observed.

Comparative Example 1

(First Transparent Conductive Film)

The transparent conductive film C was used as a first transparent conductive film.

(Second Transparent Conductive Film)

The transparent conductive film C was used as a second transparent conductive film.

(Production of Liquid Crystal Compound)

Compounds having the following composition were mixed at 150° C. for 20 minutes, and were then slowly cooled to room temperature. Thus, a liquid crystal compound (2) having a Δn of 0.23, a Δε of 13.8, and a liquid crystal temperature of from −30° C. to 58° C. was obtained.

5CB (51.0%)

7CB (25.0%)

8OCB (16.0%)

5CT (8.0%)

(Light Control Layer)

A mixed liquid of 50 parts of the liquid crystal compound (2) and 50 parts (solid content) of a UV-curable acrylic resin (manufactured by Norland Products, Inc., "NOA65") was filled into a space between the first transparent conductive film and the second transparent conductive film caused to face each other via a spacer having a thickness of 7 μm, and UV light (wavelength: 365 nm) having a light intensity of 10 mW/cm² was applied to the liquid to polymerize the monomer of the UV-curable resin. A light control layer was formed by a phase separation between the resin and the liquid crystal compound along with the polymerization. Thus, a transmissive screen D was obtained.

(Image Display Apparatus)

An image display apparatus D was formed in the same manner as in Example 1 except that the transmissive screen D was arranged as the transmissive screen 100 so that the second transparent conductive film was on a display surface side. The brightnesses of the display surface and back surface (surface on the side having arranged thereon the projector) of the transmissive screen when a white display image was projected with the image display apparatus D were measured in the same manner as in Example 1. Next, the image of a shoe and a character was projected, and the back surface (surface on the side having arranged thereon the projector) was observed.

Comparative Example 2

(First Transparent Conductive Film)

The transparent conductive film C was used as a first transparent conductive film.

(Second Transparent Conductive Film)

The transparent conductive film A was used as a second transparent conductive film.

(Light Control Layer)

A transmissive screen E was obtained in the same manner as in Comparative Example 1 except that the transparent conductive film C and the transparent conductive film A were used.

(Image Display Apparatus)

An image display apparatus E was formed in the same manner as in Example 1 except that the transmissive screen E was arranged as the transmissive screen 100 so that the second transparent conductive film was on a display surface side. The brightnesses of the display surface and back surface (surface on the side having arranged thereon the projector) of the transmissive screen when a white display image was projected with the image display apparatus E were measured in the same manner as in Example 1. Next, the image of a shoe and a character was projected, and the back surface (surface on the side having arranged thereon the projector) was observed.

Comparative Example 3

(First Transparent Conductive Film)

The transparent conductive film C was used as a first transparent conductive film.

(Second Transparent Conductive Film)

A transparent conductive film D having the configuration [antireflection layer/transparent base material/transparent electrode layer] was obtained in the same manner as in the production of the transparent conductive film A except that no refractive index adjusting layer was formed.

(Light Control Layer)

A light control layer was formed in the same manner as in Example 1 to obtain a transmissive screen F.

(Image Display Apparatus)

An image display apparatus F was formed in the same manner as in Example 1 except that the transmissive screen F was arranged as the transmissive screen 100 so that the second transparent conductive film was on a display surface side. The brightnesses of the display surface and back surface (surface on the side having arranged thereon the projector) of the transmissive screen when a white display image was projected with the image display apparatus F were measured in the same manner as in Example 1. Next, the image of a shoe and a character was projected, and the back surface (surface on the side having arranged thereon the projector) was observed.

Comparative Example 4

(First Transparent Conductive Film)

The transparent conductive film C was used as a first transparent conductive film.

(Second Transparent Conductive Film)

The transparent conductive film B was used as a second transparent conductive film.

(Light Control Layer)

A light control layer was formed in the same manner as in Example 1 to obtain a transmissive screen G.

(Image Display Apparatus)

An image display apparatus G was formed in the same manner as in Example 1 except that the transmissive screen G was arranged as the transmissive screen 100 so that the second transparent conductive film was on a display surface side. The brightnesses of the display surface and back surface (surface on the side having arranged thereon the projector) of the transmissive screen when a white display image was projected with the image display apparatus G were measured in the same manner as in Example 1. Next, the image of a shoe and a character was projected, and the back surface (surface on the side having arranged thereon the projector) was observed.

The configurations of the transmissive screens obtained in Examples 1 to 3 and Comparative Examples 1 to 4 above, and the screen brightnesses and display characteristics of the image display apparatus obtained therein are shown in Table 1. With regard to the image visibility of the back surface of each of the screens, a case in which the inverted image of the image to be displayed on the display surface was visually viewed on the back surface (surface on the side having arranged thereon the projector) under a visible illuminance environment of 150 lx was evaluated as "visible", and a case in which the inverted image was not viewed was evaluated as "invisible".

significantly reduced, and no inverted image was viewed. Meanwhile, in each of the image display apparatus of Comparative Examples 2 to 4, the back surface brightness was reduced as compared to that of Comparative Example 1, but the inverted image was viewed.

Example 4

(Image Display Apparatus)

As illustrated in FIG. 4(b), the transmissive screen A produced in Example 1 was arranged as the transmissive screen 100. The projector 200a (manufactured by ASUSTeK Computer Inc., "ZenBeam E1 Pocket LED Projector" (150 ANSI lumens)) was arranged so that its projection angle θ with respect to one surface (first display surface) of the screen became 30° and its distance therefrom became 50 cm, and the projector 200b (manufactured by ASUSTeK Computer Inc., "ZenBeam E1 Pocket LED Projector" (150 ANSI lumens)) was arranged so that its projection angle θ with respect to the other surface (second display surface) thereof became 30° and its distance therefrom became 50 cm. Thus,

TABLE 1

| | Example 1 | | Example 2 | | Example 3 | | Comparative Example 1 | | Comparative Example 2 | | Comparative Example 3 | | Comparative Example 4 | |
|---|---|---|---|---|---|---|---|---|---|---|---|---|---|---|
| Configuration | | | | | Display surface (viewer side) | | | | | | | | | |
| | Antireflection layer | A | Antireflection layer | A | Antireflection layer | A | — | C | Antireflection layer | A | Antireflection layer | D | — | B |
| | Second transparent base material | | Second transparent base material | | Second transparent base material | | Second transparent base material | | Second transparent base material | | Second transparent base material | | Second transparent base material | |
| | Refractive index adjusting layer | | Refractive index adjusting layer | | Refractive index adjusting layer | | — | | Refractive index adjusting layer | | — | | Refractive index adjusting layer | |
| | Second transparent electrode layer | | Second transparent electrode layer | | Second transparent electrode layer | | Second transparent electrode layer | | Second transparent electrode layer | | Second transparent electrode layer | | Second transparent electrode layer | |
| | Light control layer (Δn = 0.097) | | Light control layer (Δn = 0.097) | | Light control layer (Δn = 0.097) | | Light control layer (Δn = 0.23) | | Light control layer (Δn = 0.23) | | Light control layer (Δn = 0.097) | | Light control layer (Δn = 0.097) | |
| | First transparent electrode layer | A | First transparent electrode layer | B | First transparent electrode layer | C | First transparent electrode layer | C | First transparent electrode layer | C | First transparent electrode layer | C | First transparent electrode layer | C |
| | Refractive index adjusting layer | | Refractive index adjusting layer | | — | | — | | — | | — | | — | |
| | First transparent base material | | First transparent base material | | First transparent base material | | First transparent base material | | First transparent base material | | First transparent base material | | First transparent base material | |
| | Antireflection layer | | — | | — | | — | | — | | — | | — | |
| | | | | | Back surface (image source side) | | | | | | | | | |
| Display surface brightness (lx) | 300 | | 300 | | 300 | | 300 | | 300 | | 300 | | 300 | |
| Back surface brightness (lx) | 3 | | 3 | | 3 | | 50 | | 15 | | 8 | | 12 | |
| Image visibility of back surface | Invisible | | Invisible | | Invisible | | Visible | | Visible | | Visible | | Visible | |
| Visible illuminance environment (lx) | 150 | | 150 | | 150 | | 150 | | 150 | | 150 | | 150 | |

As shown in Table 1, in each of the image display apparatus of Examples, the back surface brightness was an image display apparatus H was formed. Further, the spectroradiometers 300a and 300b (manufactured by Topcon Technohouse Corporation, "SR-UL2") were arranged in the front directions of the first and second display surfaces of the transmissive screen at distances of 50 cm each, respectively. In the configuration, the brightnesses of the first and second display surfaces of the transmissive screen when white display images were simultaneously projected from the projectors 200a and 200b, respectively were measured with the spectroradiometers. Next, the images (images of a shoe and a character) identical to each other were sequentially projected from the projectors 200a and 200b, and the image source-side surface at the time of each projection was observed. In addition, the image of a building in the daytime and the image of the building in the nighttime were simultaneously projected from the projector 200a and the projector 200b, respectively, and the first and second display surfaces were observed.

Comparative Example 5

(Image Display Apparatus)

An image display apparatus I was formed in the same manner as in Example 4 except that the transmissive screen D produced in Comparative Example 1 was arranged as the transmissive screen 100. The measurement of the brightnesses of the first and second display surfaces, the observation of the back surface, and the observation of the first and second display surfaces were performed in the same manner as in Example 4 with the image display apparatus I.

The screen brightnesses and display characteristics of the image display apparatus obtained in Example 4 and Comparative Example 5 above are shown in Table 2.

TABLE 2

|  | Example 4 | Comparative Example 5 |
|---|---|---|
| Configuration | First display surface | |
|  | Antireflection layer | — |
|  | Second transparent base material | Second transparent base material |
|  | Refractive index adjusting layer | — |
|  | Second transparent electrode layer | Second transparent electrode layer |
|  | Light control layer ($\Delta n = 0.097$) | Light control layer ($\Delta n = 0.23$) |
|  | First transparent electrode layer | First transparent electrode layer |
|  | Refractive index adjusting layer | — |
|  | First transparent base material | First transparent base material |
|  | Antireflection layer | — |
|  | Second display surface | |
| Brightness of first display surface (1x) | 300 | 300 |
| Brightness of second display surface (1x) | 300 | 300 |
| Image visibility of back surface | Invisible | Visible |
| Visible illuminance environment (1x) | 150 | 150 |

As shown in Table 2, while the inverted image was viewed on the back surface in the image display apparatus of Comparative Example 5, no inverted image was viewed in the image display apparatus of Example 4. In addition, when the different images were simultaneously projected onto both the surfaces of the screen, in the image display apparatus of Comparative Example 5, a low-quality image in which the image of the building in the daytime and the image of the building in the nighttime mixed with each other was displayed. In contrast, in the image display apparatus of Example 4, in each of the first display surface and the second display surface, no image mixing occurred, and hence the images completely different from each other were displayed on the surfaces.

INDUSTRIAL APPLICABILITY

The transmissive screen of the present invention is suitably used in the field of an image display apparatus.

REFERENCE SIGNS LIST

10 transparent base material
20 transparent electrode layer
30 light control layer
40 refractive index adjusting layer
50 antireflection layer
100 transmissive screen
200 image source

The invention claimed is:

1. A transmissive screen, comprising in this order:
 a first transparent base material;
 a first transparent electrode layer;
 a light control layer containing a polymer matrix and a liquid crystal compound dispersed in the polymer matrix, wherein the light control layer is capable of switching a light transmitting state and a light scattering state in accordance with a voltage to be applied thereto;
 a second transparent electrode layer; and
 a second transparent base material,
 the transmissive screen being configured to display, on a surface on a second transparent base material side, an image projected onto a surface on a first transparent base material side,
 wherein the light control layer contains a liquid crystal compound having a birefringence of from 0.05 to 0.15,
 wherein the second transparent base material and the second transparent electrode layer have arranged therebetween a refractive index adjusting layer, and
 wherein a side opposite to a side of the second transparent base material having arranged thereon the second transparent electrode layer has arranged thereon an antireflection layer.

2. The transmissive screen according to claim 1, wherein the first transparent base material and the first transparent electrode layer have arranged therebetween a refractive index adjusting layer.

3. The transmissive screen according to claim 1, wherein a side opposite to a side of the first transparent base material having arranged thereon the first transparent electrode layer has arranged thereon an antireflection layer.

4. The transmissive screen according to claim 1,
 wherein the first transparent base material and the first transparent electrode layer have arranged therebetween a refractive index adjusting layer,
 wherein a side opposite to a side of the first transparent base material having arranged thereon the first transparent electrode layer has arranged thereon an antireflection layer, and wherein the transmissive screen is configured to display, on the surface on the second transparent base material side, the image projected onto the surface on the first transparent base material side, and to display, on the surface on the first transparent base material side, an image projected onto the surface on the second transparent base material side.

5. An image display apparatus, comprising:
the transmissive screen of claim 1; and
an image source configured to project an image onto one surface of the transmissive screen.

6. An image display apparatus, comprising:
the transmissive screen of claim 4;
an image source configured to project an image onto one surface of the transmissive screen; and
an image source configured to project an image onto another surface of the transmissive screen.

\* \* \* \* \*